United States Patent [19]

Fishwick

[11] 3,844,812

[45] Oct. 29, 1974

[54] COLORANT COMPOSITION FOR CLAY PRODUCTS AND METHOD OF MAKING COLORED CLAY PRODUCTS

[75] Inventor: John Henry Fishwick, Downingtown, Pa.

[73] Assignee: Foote Mineral Company, Exton, Pa.

[22] Filed: Dec. 15, 1972

[21] Appl. No.: 315,469

[52] U.S. Cl. .................... 106/316, 106/67, 106/72
[51] Int. Cl. ......................... C08k 1/02, C08k 1/12
[58] Field of Search ............ 106/316, 72, 67, 308 B

[56] References Cited
UNITED STATES PATENTS

| | | | |
|---|---|---|---|
| 1,168,485 | 1/1916 | Dennis | 106/316 |
| 2,618,571 | 11/1952 | Peel | 106/308 B |
| 3,711,308 | 1/1973 | Brand et al | 106/308 B |

*Primary Examiner*—Morris Liebman
*Assistant Examiner*—S. L. Fox
*Attorney, Agent, or Firm*—Howson and Howson

[57] ABSTRACT

A mixture of an ore of at least one of the metals manganese, chromium and iron and a color-promoting flux serves as an expecially useful colorant composition for shaped clay products. A method for preparing shaped clay products with improved color characteristics is also described and claimed herein.

2 Claims, No Drawings

COLORANT COMPOSITION FOR CLAY PRODUCTS AND METHOD OF MAKING COLORED CLAY PRODUCTS

BACKGROUND OF THE INVENTION

This invention relates to a colorant composition for shaped clay products and a method for preparing colored or stained shaped clay products.

Considerable attention has been given to controlling the color of shaped clay products, especially common brick, in recent years. Brick are normally made from either buff-burning clays or red-burning clays or shales. Brick made from these materials exhibit the natural color of the clay or shale in their fired state. Since, as is well known, clays and shales used in the manufacture of common brick and face brick have a very wide range of compositions depending generally on the geographical area from which the clay or shale is derived, it is difficult to control or standardize the color and hue developed in finished brick. This is particularly a problem for manufacturers of high quality face brick who must take care to ensure that they produce a uniformly colored brick.

A brick manufacturer wishing to change or standardize the color of the brick he produces may color the entire body of the brick, commonly referred to as body staining the brick, through the addition of a colorant to the clay or shale from which the brick is made. Alternatively, a colorant may be applied to the surface of the preformed, unfired brick, a process known as engobing the brick. In either case, treated brick exhibit a modified color either throughout their entire body or on the surface thereof after firing.

U.S. Pat. No. 262,339 discloses that uniformly colored brick may be obtained with the addition of metal oxides to the clay used in formulating the brick. U.S. Pat. No. 1,949,524 discloses that admixture of small amounts of manganese ore either in the form of relatively coarse granules or finely divided particles with buff burning clay results in the formation of brick having the appearance of speckled natural stone or a uniform darkened gray color. U.S. Pat. No. 3,215,542 discloses that lightweight ceramic aggregates may be colored or dyed with the addition of a metal oxide to the clay utilized in forming the lightweight ceramic aggregates. U.S. Pat. No. 3,303,036 discloses that admixture of a sodium borate and sodium silicate with a clay-containing ceramic composition provides such composition with exceptional green strength.

It is the object of this invention to provide an improved colorant composition for non-refractory clay products, particularly brick. It is a further object of this invention to provide a colorant composition equal in effectiveness to the colorants used in the past, but having properties making it especially desirable for use as a brick colorant.

DETAILED DESCRIPTION OF THE INVENTION

The present invention relates to a colorant composition for shaped clay products consisting essentially of a finely divided mixture of from about 90 to about 99 percent of an ore of at least one metal selected from the group consisting of manganese, chromium and iron, and from about 1 to about 10 percent of a color promoting flux, said percentages being by weight, based on the weight of the colorant composition. The invention also relates to an improvement in the process for preparing stained, shaped clay products wherein there is admixed with non-refractory clay from about 0.5 to about 6 percent by weight, based on the weight of the clay, of an ore colorant, and sufficient water to form a plastic mass, and the plastic mass is formed into shaped bodies which are heated at firing temperatures; which improvement comprises including in said plastic mass from about 1 to about 11 percent, by weight, of said ore colorant, of a color-promoting flux.

While the colorant composition and process described and claimed herein may be useful for improving the color of all shaped clay products, for the sake of convenience the details thereof are described in connection with the production of brick.

The colorant composition of this invention is formed by preparing a mixture containing from about 90 to about 99 percent of an ore of at least one metal selected from the group consisting of manganese, chromium and iron, and from about 1 to about 10 percent, preferably about 5 percent, of a color promoting flux, said percentages being by weight, based on the weight of the colorant composition. The composition of the ores utilized in forming the colorant composition of this invention is well known. For example, manganese ore usually contains the oxides $MnO_2$, $Mn_2O_3$, $MnO$ and $Mn_3O_4$ either alone or in any combination, chromium ores usually contain the chromite mineral $FeO \cdot Cr_2O_3$ plus magnesium and aluminum oxides while iron ores are essentially hematite, ($Fe_2O_3$) or magnetite ($Fe_3O_4$). The ores may be used individually or in admixture in any proportion in forming the colorant composition of this invention.

Ores of the above-described types are ground to a specific particle size for use in forming the colorant composition of this invention. Generally speaking, the ore will be ground to a size such that 80 to 100 percent thereof is at least −325 mesh and none of the ore has a particle size in excess of 100 mesh. Air-floated ores are thus especially preferred in this invention. It is known that the particle size of ore colorant added to clay products plays an important role in determining the depth and uniformity of the color achieved with the colorant. It can be stated generally that the finer the particle size of the colorant, the greater will be the darkening or coloring power per given amount of the colorant. However, the relatively high costs involved in preparing very finely ground ores renders increasing depth and uniformity of coloration in brick by reduction in size of the ore colorants an unacceptable alternative for brick manufacturers. According to this invention, it has been found that inclusion of a color-promoting flux with ore colorants produces a colorant composition capable of imparting a depth and uniformity of color to brick greater than that which may be obtained with the use of a comparable or even greater amounts of very finely ground ore colorant. This, of course, results in a reduction of costs to brick manufacturers.

As mentioned, the colorant composition of this invention is formed by admixing with an ore colorant from about 1 to about 10 percent, preferably about 5 percent, by weight, based on the weight of the colorant composition of a color-promoting flux. The flux serves to promote the reaction between the ore and the clay mixture with which it is combined during firing of the brick. Useful color promoting fluxes include borax, a sodium tetraborate of the formula $Na_2B_4O_7 \cdot 10 H_2O$; anhydrous rasorite, a glassy granular borate having the formula $Na_2B_4O_7$; colemanite, a calcium borate of the formula $Ca_2B_6O_{11}.5\ H_2O$; nepheline syenite, an alkali aluminum silicate of the formula $K_2O.3Na_2O.4Al_2O_3.9SiO_2$; and various silica minerals such as mica and talc. Rasorite is the preferred color promoting flux. The color-promoting flux should be in a free flowing, particulate state, preferably in a finely divided state, e.g. −200 mesh when admixed with the ore colorant.

Surprisingly, it has been found that admixture of a color promoting flux with the ore produces a colorant composition which when combined with non-refractory clays and shales in the production of shaped clay products, particularly brick, produces a greater depth and a more uniform coloration than is produced with an ore colorant alone. Further, considerable savings are incurred with the use of the ore color-promoting flux mixture since less of the expensive ore is required to obtain an equivalent degree of coloration in a given product. Also, as noted above colorant compositions formed by the admixture of a color-promoting flux with an ore result in further savings to manufacturers since these colorant compositions have been found to achieve the same depth and uniformity of color as is obtained with very finely-divided ore colorants alone. The colorant compositions of this invention also broaden the range of color values obtainable with ore colorants alone.

The colorant composition, can be formed in the manner described above, by admixture of the ore colorant and the color promoting flux prior to addition to the clays or shales utilized to form a shaped product, in which case from about 0.5 to about 6 percent, by weight, based on the weight of the clay or shale, of the colorant composition is admixed with the clay or shale used to form the shaped product. It will be appreciated that the amount of colorant composition utilized in preparing a given product will depend on the degree or intensity of color desired for that product and thus the amount of colorant added may vary considerably from that mentioned above. Alternatively, the individual components of the colorant composition can be added separately to the clays or shales during formation of the shaped clay products. This latter procedure is an additional part of this invention as described below.

This invention also relates to an improvement in the process for preparing stained, shaped clay products wherein there is admixed with non-refractory clay from about 0.5 to about 6 percent, by weight, based on the weight of the clay, or an ore colorant, and sufficient water to form a plastic mass, and the plastic mass is formed into shaped bodies which are heated at firing temperatures, which improvement comprises including in said plastic mass from about 1 to about 11 percent, preferably about 5 percent, by weight, of said ore colorant, of a color promoting flux.

In preparing stained, shaped clay products such as brick, the clay or shale or mixture of clay and shale is initially ground and then combined in any convenient apparatus such as a pug mill with a sufficient quantity of water to form a plastic mass. During formation of the plastic mass, the colorant composition or the individual components of the colorant composition are mixed with the clay or shale in the pug mill until a uniform plastic mass is obtained. After formation of the plastic mass, the mass is formed into the desired shape such as by extruding the plastic mass into a brick column and cutting the ribbon into desired lengths, e.g. brick lengths, with a cutting wire. The shapes are then dried, heated to firing temperatures of from about 1,700°F. to about 2,400°F. for about 4 hours, and cooled, producing the desired brick. It is not necessary to describe the non-refractory clays and shales or mixture of clays and shales utilized in forming the shaped products described herein since their composition is well known to those in the art.

The colorant composition of this invention has another especially attractive attribute. Many non-refractory clays and shales utilized in forming brick contain high levels of soluble sulfates which are thought to be responsible for the development of white efflorescence on the surface of brick made with such clays or shales. In the past, barium carbonate has been incorporated in sulfate containing clays or shales to reduce the development efflorescence; however, while barium carbonate reduces efflorescence, it does not improve the color of the brick. The colorant compositions of this invention have been found to reduce the efflorescence phenomenon resulting from the migration of soluble sulfate salts to the surface of common or face brick, while at the same time lending favorable color characteristics to the brick and thus eliminate the necessity of including expensive barium carbonate in the brick.

This invention will be more fully described in the following example.

EXAMPLE 1

A series of brick formulations were prepared from varying types of clays and shales containing varying amounts of the ore color-promoting flux colorant composition of this invention. For comparison, a comparable group of brick were prepared containing only an ore colorant. In each case, the colorant composition or ore was combined with the clay or shale in the dry state and well mixed. The resultant powder was then mixed with sufficient water and mixed in a pug mill until a plastic mass formed. The resultant plastic mass was extruded into a brick column, cut, dried and fired at 1,800° – 2,200°F. for 1 hour. The depth and uniformity of color of the resultant brick was determined using a Hunter reflectometer fitted with a green filter and measuring the 45° reflection. A Gardner standard plate with a green reflectance of 15.4 was used to calibrate the reflectometer. The results of this test are set forth in Table I, as a "darkness value," in which the lower the figure, the darker the brick. In this scale small reductions in darkness value represent relatively large increases in visual darkness.

TABLE I

| Sample No. | Clay Material | Color Promoting Additive* | Particle Size of Colorant | DARKNESS VALUE HUNTER REFLECTOMETER |
|---|---|---|---|---|
| 1 | Shale from Southern U.S. | 2% manganese ore | | 12.1 |

TABLE I—Continued

| | BRICK COMPOSITION | | | DARKNESS VALUE HUNTER REFLECTOMETER |
|---|---|---|---|---|
| Sample No. | Clay Material | Color Promoting Additive* | Particle Size of Colorant | |
| 2 | Shale from Southern U.S. | 2% of a mixture of 95% manganese ore and 5% rasorite | | 10.3 |
| 3 | Shale from Southern U.S. | 4% manganese ore | | 10.0 |
| 4 | Shale from Southern U.S. | 4% of a mixture of 95% manganese ore and 5% rasorite | | 9.2 |
| 5 | Pennsylvania fireclay | 2% chromite ore | | 27.6 |
| 6 | Pennsylvania fireclay | 2% mixture of 95% chromite | | 25.2 |
| 7 | Pennsylvania fireclay | 4% chromite ore | | 20.6 |
| 8 | Pennsylvania fireclay | 4% of a mixture of 95% chromite ore and 5% rasorite | | 18.8 |
| 9 | Pennsylvania fireclay | 4% iron ore | | 22.7 |
| 10 | Pennsylvania fireclay | 4% of a mixture of 95% iron ore and 5% rasorite | | 21.0 |
| 11 | Canadian shale | 4% ocher (an iron oxide) | | 16.5 |
| 12 | Canadian shale | 4% of a mixture of 95% ocher and 5% rasorite | | 11.3 |
| 13 | Canadian shale | 4% umber (an iron oxide) | | 17.3 |
| 14 | Canadian shale | 4% of a mixture of 95% umber and 5% rasorite | | 11.4 |

*% by weight, based on weight of clay

What is claimed is:

1. A colorant composition for shaped clay products consisting essentially of a finely-divided mixture of from about 90 to 99 percent of an ore selected from the group consisting of manganese, chromium, and iron, and from about 1 to about 10 percent of a color-promoting flux selected from the group consisting of borax, rasorite, colemanite, nepheline syenite, mica and talc, said percentages being by weight, based on the total weight of said colorant composition.

2. The colorant composition of claim 1 containing from about 95 to about 99 percent of said ore and from about 1 to about 5 percent of said color-promoting flux.

* * * * *